D. I. CHELEY.
SEED DRILL.
APPLICATION FILED SEPT. 29, 1911.
1,038,852.
Patented Sept. 17, 1912.
3 SHEETS—SHEET 1.
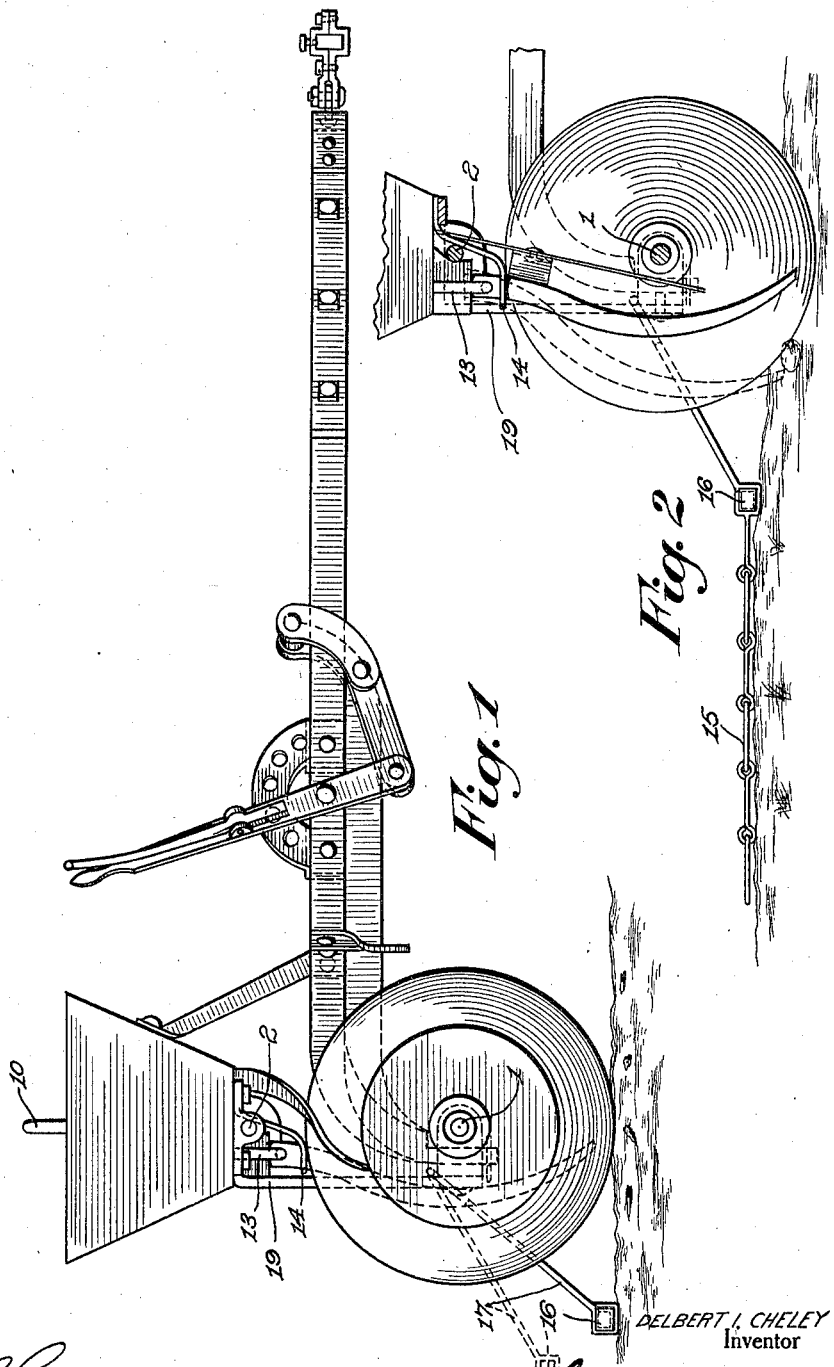
Witnesses:
DELBERT I. CHELEY
Inventor
By
Attorneys

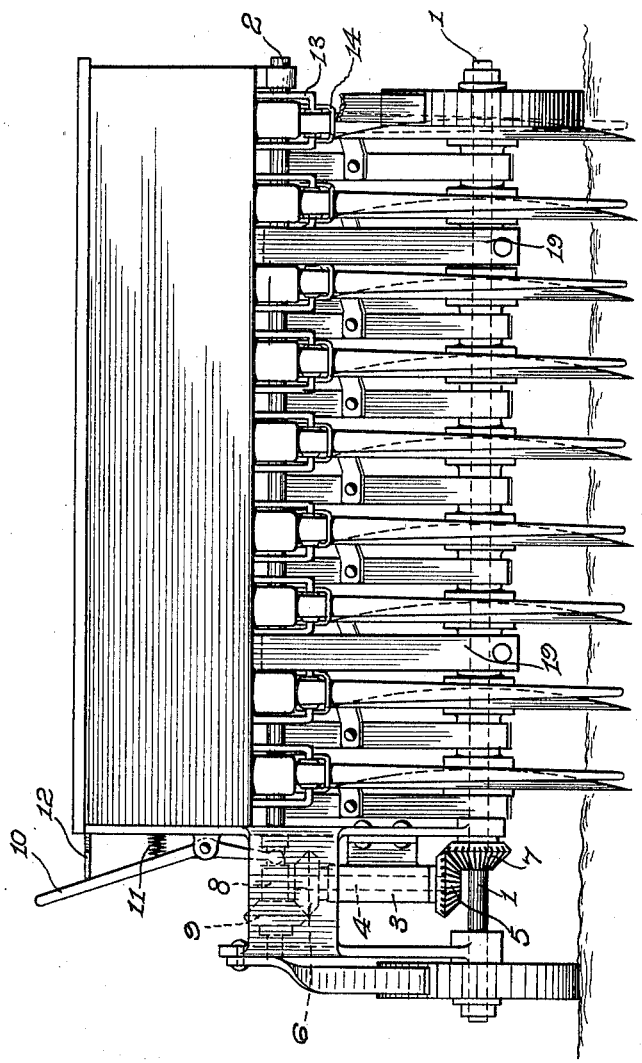

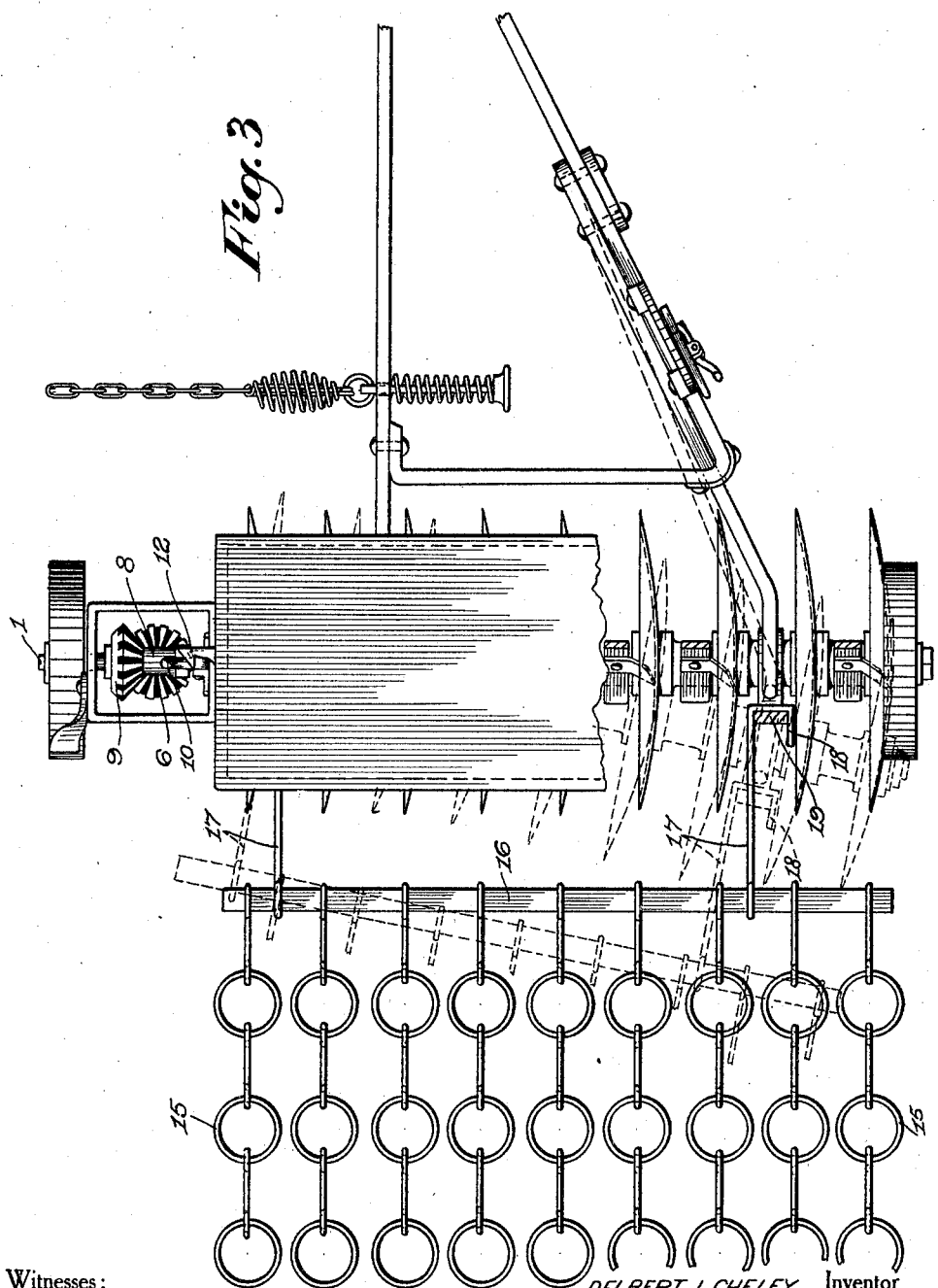

UNITED STATES PATENT OFFICE.

DELBERT I. CHELEY, OF CARNDUFF, SASKATCHEWAN, CANADA.

SEED-DRILL.

1,038,852.  Specification of Letters Patent.  Patented Sept. 17, 1912.

Application filed September 29, 1911. Serial No. 651,923.

*To all whom it may concern:*

Be it known that I, DELBERT I. CHELEY, a subject of the King of Great Britain, residing at Carnduff, in the Province of Saskatchewan, Canada, have invented certain new and useful Improvements in Seed-Drills; and I do hereby declare that the following is a full, clear, and exact description of the invention, such as will enable others skilled in the art to which it appertains to make and use the same.

The invention to be hereinafter described relates to seed grain drills and attachments.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the invention, complete; Fig. 2 is a vertical cross section; Fig. 3 is a top plan view of the invention, partly broken away; Fig. 4 is a rear elevation, with the drag removed.

Referring to the drawings in detail, 1 indicates the rotary axle to which are secured the usual disks. From this axle extend the arms or brackets on which is mounted the usual seed box. Beneath this box and parallel with the axle 1 is journaled a feeder shaft 2. Preferably, this feeder shaft is journaled in small hangers depending from the seeder box and it extends through the enlargements or seed pockets at the top of each seed drill. The usual feeder cups are fixed to this shaft, of course. These cups are of well known type and need no further mention. One of the above mentioned arms or brackets carries the sleeve 3 in which is journaled a short shaft 4 to the opposite ends of which are secured bevel gears 5 and 6. The gear 5 is adapted to mesh with and be driven by a bevel gear 7 fixed to the axle 1. On the feeder shaft 2 is slidably keyed a sleeve 8 carrying a bevel gear 9. A lever 10 is pivotally mounted on one end of the seed box and provided with a fork which engages the sleeve 8, to slide the gear 9 toward or from gear 6 to mesh or unmesh the two gears. When the two gears 6 and 9 are intermeshed, the feed shaft will be driven, and when they are not intermeshed it will be stationary. The lever is held in operative position by means of a spring 11 but may be kept inoperative by engagement behind the shoulder of the beveled catch 12, the mounting of the lever having sufficient play to permit it to slip behind this shoulder.

In order to permit each seed drill to give when an obstruction is met, a pivotal connection is provided. This comprises a staple or U shaped bar 13 extending downwardly from the seed box and through the upper end of each tooth. The tooth swings on this pivot, as shown in dotted lines in Fig. 2. To hold each tooth normally in operative position, a U shaped spring 14 is provided. The ends of the spring are secured to the bottom of the seed box on each side of and in front of the seed drill, and the loop of the spring extends around the drill and exerts a forward pressure thereon.

In order to cover the seed, a chain drag is provided compressing a plurality of separate chains 15 all connected to a bar 16. This bar is provided with connecting bars 17 having hooks 18 by which the drag may be connected to the arms or brackets 19 which support the seed box. Thus, the drag may be very readily and quickly connected or disconnected.

It is thought that the operation and use of the invention will be clear from the preceding detailed description.

Changes may be made in the construction, arrangement, and disposition of the several parts of the invention without in any way departing from the field and scope of the same and it is meant to include all such within this application wherein only a preferred form has been disclosed.

Having thus fully described my invention, what I claim as new and desire to secure by Letters Patent is:

In combination, a seed box provided with a seed outlet, a U shaped bar extending downwardly from said box beneath said opening, a seed drill pivotally mounted on said bar and adapted to receive seed through said opening, and a spring secured to said seed box and extending about the rear of said drill, said spring being adapted to engage the rear of the drill to yieldingly maintain the drill in operative position.

In witness whereof I have hereunto set my hand in the presence of two witnesses.

DELBERT I. CHELEY.

Witnesses:
W. B. BUTCHART,
A. H. FOULDS.

Copies of this patent may be obtained for five cents each, by addressing the "Commissioner of Patents, Washington, D. C."